United States Patent Office

3,631,050
Patented Dec. 28, 1971

3,631,050
HEXAHYDRO-9b-METHYLFURO[3,2-c] QUINOLINE COMPOUNDS
Edward F. Elslager and Donald F. Worth, Ann Arbor, Mich., assignors to Parke, Davis & Company, Detroit, Mich.
No Drawing. Filed Nov. 13, 1968, Ser. No. 775,492
Int. Cl. C07d 99/04
U.S. Cl. 260—287 R                                   5 Claims

ABSTRACT OF THE DISCLOSURE

A series of 2,3,3a,4,5,9b-hexahydro-9b-methyl-4-phenyl-furo[3,2-c]quinoline compounds variously substituted at the 8 position of the furoquinoline ring system and/or at the para position of the 4-phenyl group. The substituent at one of the indicated positions is hydroxy or acyloxy and at the other of the indicated positions is hydrogen, hydroxy, lower alkoxy, or acyloxy. The compounds have hypocholesteremic activity and can be produced by (a) reacting an N-benzylideneaniline compound with 5-methyl-2,3-dihydrofuran in the presence of a Lewis acid, (b) converting a hydroxy group to a lower alkoxy group, (c) esterifying a hydroxy group, or (d) hydrolyzing an ester group.

SUMMARY AND DETAILED DESCRIPTION

This invention relates to new organic nitrogen compounds. More particularly, it relates to hexahydro-9b-methylfuro[3,2-c]quinoline compound of the formula

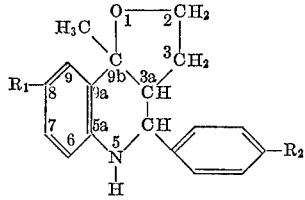

including salt forms thereof, and to methods for their production; where one of $R_1$ and $R_2$ represents hydroxy or —OAc and the other of $R_1$ and $R_2$ represents hydrogen, hydroxy, lower alkoxy, or —OAc; where Ac represents an acyl radical of a carboxylic acid. As illustrated in specific embodiments herein, Ac preferably represents an acyl radical of a carboxylic acid containing not more than 20 carbon atoms and containing no elements other than carbon, hydrogen, oxygen, nitrogen, sulfur, and halogens. Some specific types of such acyl radicals, according to the invention, are (a) Acyl radicals of hydrocarbon carboxylic acids containing not more than 20 carbon atoms, (b) Acyl radicals of hydrocarbon carboxylic acids containing not more than 14 carbon atoms and additionally substituted by halogen, phenoxy, monohalophenoxy, dihalophenoxy, trihalophenoxy, monomethoxy, dimethoxy, or trimethoxy, said substituted acyl radicals thereby being acyl radicals of carboxylic acids containing not more than 20 carbon atoms, (c) Acyl radicals of nicotinic acid, 3-pyridineacetic acid, 5 - methylpyrazole-3-carboxylic acid, 2-chlorocinchoninic acid, furancarboxylic acid, and thiophenecarboxylic acid, (d) Acyl radicals of O-acetylmandelic acid, N-[1-methyl-2,3 - bis(p-chlorophenyl)propyl]maleamic acid, and 2-methyl - 2-[p-(1,2,3,4-tetrahydro - 1-naphthyl)-phenoxy] propionic acid.

The preferred halogens are chlorine and bromine, especially chlorine. The preferred lower alkoxy groups in the above formula contain not more than 4 carbon atoms, and of these methoxy is especially preferred.

The compounds of the invention exist in various isomeric forms. In all of the compounds of the invention the 3a-hydrogen atom and the 9b-methyl group have the cis-configuration relative to each other. When the phenyl or substituted phenyl group at position 4 has the trans-configuration relative to the 3a-hydrogen atom and the 9b-methyl group, the compound is designated "isomer A." When the phenyl or substituted phenyl group at position 4 has the cis-configuration relative to the 3a-hydrogen atom and the 9b-methyl group, the comound is designated "isomer B." Each of isomer A and isomer B exists in racemic forms as well as optically active d- and l- forms. As indicated above and further explained below, the compounds also exist in salt forms, and the hexahydro-9b-methylfuro[3,2-c]quinoline formulas herein are to be interpreted as including the salt forms.

In accordance with the invention, the foregoing compounds can be produced by reacting an N-benzylideneaniline compound of the formula

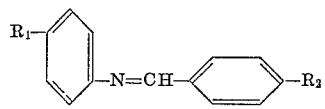

with 5-methyl-2,3-dihydrofuran of the formula

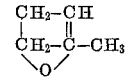

in the presence of a Lewis acid; where $R_1$ and $R_2$ are as defined before. As used herein, the term "Lewis acid" has the meaning accepted in the art and designates a substance containing an atom which has an incomplete electron shell and is therefore electrophilic in character. Some examples of Lewis acids suitable for use in the process of the invention are aluminum chloride, aluminum bromide, and boron trifluoride. The preferred Lewis acid is boron trifluoride which is normally used in the form of the etherate. Some suitable solvents for use in the reaction are benzene, nitrobenzene, pentane, hexane, methylene chloride, dioxane, tetrahydrofuran, ether, and ethyl acetate. The N-benzylideneaniline compound and the 5-methyl-2,3-dihydrofuran are normally used in equimolar quantities although an excess of either can be used if desired. It is customary to use less than an equimolar amount of the Lewis acid and a catalytic amount is sufficient. The time and temperature of the reaction are not critical. The reaction is exothermic at room temperature and, thus, external heating is not necessary. In general, the reaction is carried out at a temperature of from 0 to 100° C. for from 1 to 24 hours, the preferred conditions being room temperature for approximately 3 hours. If desired, the progress of the reaction can be followed by thin layer chromatography and the product isolated when all or the calculated amount of the N-benzylideneaniline compound has been consumed.

The N-benzylideneaniline compounds required as starting materials in the foregoing process can be obtained by reacting appropriately substituted aniline and benzaldehyde compounds.

Also in accordance with the invention, the lower alkyl ethers of the invention, that is the compounds wherein either $R_1$ or $R_2$ represents lower alkoxy, can be produced by reacting the corresponding hydroxy compounds with an alkylating agent whereby the hydroxy group is converted to a lower alkoxy group. The alkylating agent is preferably a reactive derivative of a lower alkanol such as dimethyl sulfate, ethyl iodide, propyl bromide, propyl iodide, butyl iodide, or methyl p-toluenesulfonate. The alkylation reaction is carried out in an unreactive solvent such as ether, tetrahydrofuran, dioxane, benzene, N-methyl-2-pyrrolidinone, or dimethylformamide, preferably in the presence of a strong base. Some examples of suitable strong bases are alkali metal hydrides alkali metal amides, and alkali metal alkoxides. A preferred strong base is sodium hydride. The hydroxy compound, base, and alkylating agent can be used in equimolar quantities although an excess of the alkylating agent can also be used if desired. The time and temperature of the reaction are not critical and the reaction is conveniently carried out at a temperature of 0–50° C. or the reflux temperature of the solvent for from 30 minutes to 2 hours.

Further in accordance with the invention, the esters of the invention, that is the compounds wherein either or both of $R_1$ and $R_2$ represent —OAc, can be produced by reacting the corresponding hydroxy compounds (wherein either or both of $R_1$ and $R_2$ represent hydroxy) with a carboxylic acid of the formula AcOH or a reactive derivative thereof; where Ac is as defined before. Some examples of suitable reactive derivatives of the carboxylic acid are the acid halides and the acid anhydrides. The reactants can be used in equimolar amounts although it is preferable to use an excess of the carboxylic acid or its reactive derivative. The reaction can be carried out in the absence of a solvent or in the presence of a suitable solvent such as a tertiary amine, ether, tertiary amide, aromatic hydrocarbon, or halogenated hydrocarbon. The reaction is preferably carried out in the presence of a base. Some examples of suitable bases are alkali metal hydrides, alkali metal amides, alkali metal alkoxides, and tertiary amines. A preferred solvent is pyridine which can also serve as the base in the reaction. When the carboxylic acid is a reactant, the reaction is sometimes carried out under acidic conditions. The time and temperature of the reaction are not critical but in general higher temperatures and a longer reaction time are used when the carboxylic acid is a reactant rather than one of its reactive derivatives. Normally the reaction is carried out at a temperature from 0 to 100° C., or the flux temperature of the solvent, for from one to 24 hours. In order to avoid side reactions, it is desirable to avoid the use of conditions more drastic than necessary.

In many cases the carboxylic acids and their reactive derivatives required as starting materials in the foregoing process are known compounds. In other cases they can be prepared by any of a variety of methods. For example, an alkali metal derivative of a compound of the formula $$CH_3-\overset{CH_3}{\underset{}{CH}}-COOH$$

is reacted in an anhydrous solvent with a phenoxyalkyl halide of the formula

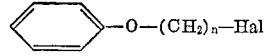—O—$(CH_2)_n$—Hal and the reaction mixture then hydrolyzed with aqueous acid to produce a carboxylic acid of the formula

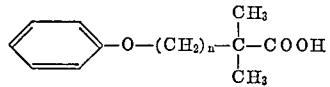—O—$(CH_2)_n$—$\overset{CH_3}{\underset{CH_3}{C}}$—COOH wherein $n$ is an integer and Hal represents halogen, preferably chlorine or bromine. The carboxylic acids can then be converted to the acid chlorides by reaction with thionyl chloride.

Still further in accordance with the invention, the hydroxy compounds of the invention, that is the compounds wherein either or both of $R_1$ and $R_2$ represent hydroxy, can be produced by reacting the corresponding esters (wherein either or both of $R_1$ and $R_2$ represent —OAc) with a hydrolytic agent; where Ac is defined before. Some examples of suitable hydrolytic agents are water and aqueous solutions of bases or acids, such as alkali metal hydroxides, alkaline earth metal hydroxides, alkali metal carbonates, trialkylammonium hydroxides, mineral acids, and strong organic acids. When $R_1$ in the starting material or final product is hydroxy, acidic reaction conditions are preferred. It is desirable to use also an additional solvent such as a lower alkanol, or glycol, or a water soluble ether. At least the calculated amount and preferably a considerable excess of the hydrolytic agent is used. While the time and temperature of the reaction are not critical, it is customary to carry out the hydrolysis at a temperature of from 15 to 150° C., or at the reflux temperature, for from 15 minutes to 96 hours, the longer reaction times being used at the lower temperatures. In the case of the hydrolysis of esters which are not sterically hindered, the customary reactionconditions are 65–85° C. for a period of one to 4 hours.

As indicated previously, the compounds of the invention exist in the forms designated "isomer A" and "isomer B." Each of isomer A and isomer B exists in racemic form as well as in optically active d- and l-forms. When the compounds of the invention are produced by reacting an N-benzylideneaniline compound with 5 - methyl - 2,3 - dihydrofuran, the reaction product normally consists of isomer A and isomer B in varying proportions depending on the particular compounds and reaction conditions involved. When subsequent reactions are carried out such as alkylation of a phenolic group, esterification of a phenolic group, or hydrolysis of a phenolic ester, these reactions do not normally involve interconversion between the isomer A form and the isomer B form. For example, if a hydroxy compound of the invention in the form of 100% isomer A is esterified, the reaction product will consist of 100% of the isomer A form. On the other hand, if an ester of the invention consisting of 25% isomer A and 75% isomer B is fractionated by crystallization or by chromatography, the proportion of each isomer will vary from fraction to fraction.

The best method of distinguishing between isomer A and isomer B or measuring the proportions of isomer A and isomer B present in a mixture is by determining the nuclear magnetic resonance spectrum. For example, the nuclear magnetic resonance spectrum of isomer A and isomer B or a mixture of the isomers is determined in a 60-megacycle nuclear magnetic resonance spectrometer in an appropriate solvent containing tetramethylsilane as an internal standard. The tetramethylsilane peak is arbitrarily assigned a value of 0 parts per million. In general, the peak from the 9b-methyl group in isomer A is located downfield relative to the peak from the 9b-methyl group in isomer B. Thus, in chloroform-d (hydrogen of chloroform substituted by deuterium) the 9b-methyl signal is at 1.7 parts per million in isomer A; at 1.4 parts per million in isomer B. In dimethyl-$d_6$ sulfoxide (all hydrogens of dimethyl sulfoxide substituted by deuterium) the 9b-methyl signal is at 1.6 parts per million in isomer A; at 1.2 parts per million in isomer B. In pyridine the 9b-methyl signal is at 1.8 parts per million in isomer A; at 1.5 parts per million in isomer B. In addition, the signal obtained as a doublet from the proton at position 4 differs significantly between isomer A and isomer B. For isomer A this doublet has a much smaller J-value and is located further downfield. The J-value is a measure of how far apart the two peaks of the doublet are from each other.

Isomer A and isomer B can be separated from each other by any of a variety of methods such as by fractional crystallization and by chromatography. For those compounds of the invention containing one or two hydroxy groups, the preferred chromatographic adsorbent is silica gel. For other compounds of the invention, the preferred adsorbent is alumina. Either isomer A or isomer B can be separated into the optically active d- and l-forms by resolution procedures. For example, a hydroxy compound of the invention is esterified with an optically active acid. The resulting diastereoisomeric esters are separated by fractional crystallization and, if desired, reconverted by hydrolysis to the optically active hydroxy compounds.

The heterocyclic amino group present in the compounds of the invention is a weakly basic group. The hydroxy groups (including the hydroxy group substituted on the phenyl ring and the hydroxy group substituted directly on the furoquinoline ring system) present in some of the compounds of the invention are weakly acidic, phenolic groups. Accordingly, the compounds of the invention have varied and somewhat limited capabilities for salt formation. By virtue of their properties as weak bases, they form salts with mineral acids such as hydrochloric acid, hydrobromic acid, sulfuric acid, and phosphoric acid, and with strong organic acids such as p-toluenesulfonic acid. By virtue of their properties as weak acids, the compounds containing hydroxy groups form salts with relatively strong inorganic and organic bases such as sodium hydroxide, potassium hydroxide, tetramethylammonium hydroxide, and choline. The compounds of the invention containing hydroxy groups also exist to a limited extent in the form of salts formed by interaction between the heterocyclic amino group and the hydroxy group or groups. The salts formed with various acids and bases are generally equivalent to the corresponding parent compounds and are within the scope of the invention. However, the salts with external acids and bases are not preferred forms of the invention because they are relatively unstable and tend to dissociate under neutral conditions and in aqueous media.

The compounds of the invention are new chemical substances, of value as pharmacological agents which exhibit hypocholesteremic activity. The hypocholesteremic activity of the compounds of the invention can be measured by observing their effect on plasma cholesterol levels in rats. Male rats weighing 200–250 g. are maintained on a normal pellet diet. Each rat in a group of ten is given a selected daily dose of a test compound by intubation for one week. Control rats are maintained on the same diet without a test compound. At the end of this period the animals are weighed and sacrificed. Average plasma cholesterol levels are determined in the treated rats and compared with average plasma cholesterol levels of untreated controls. The blood samples are taken from the vena cava. The analytical method used is described in "Journal of Laboratory and Clinical Medicine," 50, 318 (1957).

In a representative determination according to the foregoing procedure, p-(2,3,3a,4,5,9b-hexahydro-9b-methylfuro[3,2-c]quinolin-3-yl)phenol (30% isomer A and 70% isomer B) at a dose of 20 mg./kg./day produced a 51% reduction in the cholesterol level. Pure isomer A at 25 mg./kg./day produced a 51% reduction in the cholesterol level; and pure isomer B at 25 mg./kg./day produced a 42% reduction in the cholesterol level. As illustrated above, among the compounds of the invention isomer A and isomer B have qualitatively and quantitatively similar activities. The preferred compounds of the invention are 2,3,3a,4,5,9b-hexahydro-4-(p-hydroxyphenyl)-9b-methylfuro[3,2-c]quinolin-8-ol and its esters. In the rat test described above, 2,3,3a,4,5,9b-hexahydro-4 - (p-hydroxyphenyl)-9b-methylfuro[3,2-c]quinolin-8-ol (60% isomer A and 40% isomer B) at 5 mg./kg./day produced a 50% reduction in the cholesterol level. The compounds of the invention are active on oral administration and can also be given by the parenteral route if desired.

The invention is illustrated by the following examples.

Example 1

A mixture is prepared by addition of 3 ml. of boron trifluoride etherate to a solution of 86 g. of N-p-hydroxybenzylideneaniline and one liter of dioxane. A solution of 39 g. of 5-methyl-2,3-dihydrofuran in 100 ml. of dioxane is added dropwise. The reaction mixture is allowed to stand 3 hours at room temperature and then poured into a large volume of water. The resulting precipitate of p-(2,3,3a,4,5,9b-hexahydro-9b-methylfuro-[3,2-c]quinolin-4-yl)phenol is collected on a filter and washed with water. For separation into isomers, the product is crystallized from acetonitrile. The first crop is isomer B; M.P. 226–228° C. The second crop is isomer A; M.P. 205–208° C. The third crop is a mixture of 30% isomer A and 70% isomer B; M.P. 218–224° C.

Example 2

A mixture is prepared by the addition of 10 drops of boron trifluoride etherate to a solution of 10 g. of N-benzylidene-p-hydroxyaniline in 120 ml. of dioxane. A solution of 4.6 g. of 5-methyl-2,3-dihydrofuran in 10 ml. of dioxane is slowly added. After the exothermic reaction subsides, the mixture is poured into cold water and the insoluble product collected on a filter and washed with water. It is 2,3,3a,4,5,9b-hexahydro-9b-methyl-4-phenylfuro[3,2-c]quinolin-8-ol; M.P. 235–241° C. following crystallization from 95% ethanol (mixture of 20% isomer A and 80% isomer B).

Example 3

A mixture of 170 g. of N-(p-hydroxybenzylidene)-p-hydroxyaniline, 7 liters of dioxane, 10 ml. of boron trifluoride etherate, and 70 g. of 5-methyl-2,3-dihydrofuran is stirred at room temperature for 3 days and then treated with an additional 0.5 ml. of boron trifluoride etherate and 10 ml. of 5-methyl-2,3-dihydrofuran. The mixture is stirred for 24 hours at room temperature and concentrated almost to dryness. The residue is triturated with acetonitrile. The product is 2,3,3a,4,5,9b-hexahydro-4 - (p-hydroxyphenyl)-9b-methylfuro[3,2-c]quinolin-8-ol; M.P. 248–250° C. following crystallization from acetone (60% isomer A and 40% isomer B).

Example 4

With stirring, 1 ml. of boron trifluoride etherate and 36 g. of 5-methyl-2,3-dihydrofuran are added to a solution of 94 g. of N-(p-methoxybenzylidene)-p-hydroxyaniline in 800 ml. of dioxane at 40° C. After one hour the mixture is concentrated almost to dryness and the residue boiled 20 minutes with 1.5 liters of acetonitrile. The mixture is cooled and the insoluble product collected on a filter; 2,3,3a,4,5,9b-hexahydro-4-(p-methoxyphenyl)-9b-methylfuro[3,2-c]quinolin-8-ol (85% isomer A and 15% isomer B); M.P. 242–245° C. The filtrate is concentrated to a volume of 300 ml. and cooled. A second product is collected consisting of 2,3,3a,4,5,9b-hexahydro-4 - (p-methoxyphenyl)-9b-methylfuro[3,2-c]quinolin-8-ol (15% isomer A and 85% isomer B); M.P. 167–210° C.

Example 5

By the general procedure of Example 4, with the substitution of N-(p-hydroxybenzylidene)-p-methoxyaniline for the N-(p-methoxybenzylidene)-p-hydroxyaniline, there is obtained p-(2,3,3a,4,5,9b-hexahydro-8-methoxy-9b - methylfuro[3,2-c]quinolin-4-yl)phenol as isomeric mixtures. The first product contains 20% isomer A and 80% isomer B; M.P. 198–200° C. The second product contains 90% isomer A and 10% isomer B; M.P. 171–176° C.

Example 6

With stirring, 13 g. of 5-methyl-2,3-dihydrofuran is added dropwise to a solution of 37 g. of N-(p-hydroxybenzylidene)-p-acetoxyaniline, 0.2 ml. of boron trifluoride etherate, and 500 ml. of ethyl acetate. After 3 hours the mixture is concentrated to dryness to give a residue of 2,3,3a,4,5,9b - hexahydro - 4 - (p-hydroxyphenyl)-9b-methylfuro[3,2-c]quinolin-8-ol. 8-acetate ester. For purification, the product is crystallized from acetonitrile. A first crop contains 40% isomer A and 60% isomer B;

M.P. 199–200° C. A second crop is isomer B; M.P. 209–213° C.

Example 7

By the general procedure of Example 6, with the substitution of 37 g. of N-(p-acetoxybenzylidene(-p-hydroxyaniline for the N-(p-hydroxybenzylidene)-p-acetoxyanilnie, there is obtained 2,3,3a,4,5,9b-hexahydro-4-(p-hydroxyphenyl)-9b-methylfuro[3,2-c]quinolin - 8 - ol, p-acetate ester; M.P. 210–214° C. (50% isomer A and 50% isomer B).

Example 8

A solution of 6.8 g. of 2,3,3a,4,5,9b-hexahydro-4-(p-hydrophenyl)-9b-methylfuro[3,2-c]quinolin - 8 - ol, 8-acetate ester and 20 ml. of dimethylformamide is treated with 1.0 g. of a 55% mineral oil dispersion of sodium hydride. This reagent converts the phenolic group to the sodium salt. Theer is then added 2.5 g. of 1-bromopropane and the mixture is stirred for one hour and filtered. The filtrate is diluted with 650 ml. of water and the insoluble product collected. It is 2,3,3a,4,5,9b-hexahydro-9b-methyl-4-(p-propoxyphenyl)furo[3,2-c]quinolin - 8 - ol, acetate ester.

Example 9

With stirring, 1 g. of a 55% sodium hydride dispersion in mineral oil is slowly added to a solution of 5 g. of p-(2,3,3a,4,5,9b-hexahydro - 9b - methylfuro[3,2-c]quinolin-4-yl)phenol (isomer A) in 25 ml. of dioxane. After one hour the mixture is cooled and 3 g. of phenoxyacetyl chloride is added dropwise. After one more hour the reaction mixture is poured into ice-water and the oily product which separates is collected. It is phenoxyacetic acid, p-[2,3,3a,5,9b-hexahydro - 9b - methylfuro[3,2-c]quinolin-4-yl]phenyl ester (isomer A); M.P. 120–125° C. following crystallization from methanol.

Example 10

A solution of 10 g. of p-(2,3,3a,4,5,9b-hexahydro-8-methoxy - 9b - methylfuro[3,2 - c]quinolin-4-yl)phenol (mixture of isomer A and isomer B) and 110 ml. of pyridine is treated dropwise with 2.5 g. of acetyl chloride at a temperature below 35° C. After 3 hours an additional 0.6 g. of acetyl chloride is added and the mixture is stirred for 18 hours and diluted with excess cold 2.5% aqueous ammonia. The mixture is extracted with ether and the ether extract is washed with water, with 0.1 N hydrochloric acid, with water, dried, and evaporated to give a residue of p-(2,3,3a,4,5,9b-hexahydro-8-methoxy-9b-methylfuro[3,2-c]quinolin-4-yl)phenol, acetate ester. For purification the product is crystallized from isopropyl alcohol; M.P. 151–153° C. (50% isomer A and 50% isomer B).

Similarly, from 2,3,3a,4,5,9b-hexahydro-4-(p-methoxyphenyl)-9b-methylfuro[3,2-c]quinolin - 8 - ol and acetyl chloride, the product obtained is 2,3,3a,4,5,9b-hexahydro-4-(p-methoxy) - 9b - methylfuro[3,2-c]quinolin-8-ol, acetate ester; M.P. 138–148° C. following crystallization from isopropyl alcohol (40% isomer A and 60% isomer B).

Similarly, from 2,3,3a,4,5,9b-hexahydro-4-(p-methoxyphenyl)-9b-methylfuro[3,2-c]quinolin-8-ol and heptanoyl chloride, the product obtained is heptanoic acid, 2,3,3a,4,5,9b-hexahydro-4-(p-methoxyphenyl) - 9b - methylfuro[3,2-c]quinolin-8-yl ester; M.P. 98–99° C. following crystallization from benzene (70% isomer A and 30% isomer B).

Similarly, from 2,3,3a,4,5,9b-hexahydro-4-(p-hydroxyphenyl)-9b-methylfuro[3,2-c]quinolin-8-ol and two equivalents of acetyl chloride, the product obtained is 2,3,3a,4,5,9b-hexahydro-4-(p-hydroxyphenyl) - 9b - methylfuro[3,2-c]quinolin-8-ol, diacetate ester. The M.P. of isomer B is 196–200° C.

Similarly, from 2,3,3a,4,5,9b-hexahydro-4-(p-hydroxyphenyl)-9b-methylfuro[3,2-c]quinolin-8-ol and two equivalents of heptanoyl chloride, the product obtained is heptanoic acid, diester with 2,3,3a,4,5,9b-hexahydro-4-(p-hydrophenyl)-9b-methylfuro[3,2-c]quinolin-8-ol; M.P. 88–91° C. following crystallization from isopropyl alcohol (10% isomer A and 90% isomer B).

Similarly, from p-(2,3,3a,4,5,9b-hexahydro-8-methoxy-9b-methylfuro[3,2-c]quinolin-4-yl)phenol and 2-(2,4-dibromophenoxy)propionyl chloride, the product obtained is 2-(2,4-dibromophenoxy)propionic acid, ester with p-(2,3,3a,4,5,9b - hexahydro-8-methoxy - 9b - methylfuro-[3,2-c]quinolin-4-yl)phenol.

Similarly, from 2,3,3a,4,5,9b-hexahydro-4-(p-hydroxyphenyl)-9b-methylfuro[3,2-c]quinolin-8-ol and two equivalents of 2-(p-chlorophenoxy)-2-methylpropionyl chloride, the product obtained is 2-methyl-2-(p-chlorophenoxy)propionic acid, diester with 2,3,3a,4,5,9b-hexahydro-4-(p-hydroxyphenyl)-9b-methylfuro[3,2-c]quinolin-8-ol.

Similarly, from 2,3,3a,4,5,9b-hexahydro-4-(p-hydroxyphenyl)-9b-methylfuro[3,2-c]quinolin-8-ol and two equivalents of 2-(2,4,6-trichlorophenoxy)propionyl chloride, the product obtained is 2-(2,4,6-trichlorophenyl)propionic acid, diester with 2,3,3a,4,5,9b-hexahydro-4-(p-hydroxyphenyl)-9b-methylfuro[3,2-c]quinolin-8-ol.

Similarly, from 2,3,3a,4,5,9b-hexahydro-4-(p-hydroxyphenyl)-9b-methylfuro[3,2-c]quinolin-8-ol and two equivalents of 2,2 - dimethyl-5-phenoxyvaleryl chloride, the product obtained is 2,2-dimethyl-5-phenoxyvaleric acid, diester with 2,3,3a,4,5,9b-hexahydro-4-(p-hydroxyphenyl)-9b-methylfuro[3,2-c]quinolin-8-ol.

Similarly, from 2,3,3a,4,5,9b-hexahydro-4-(p-hydroxyphenyl)-9b-methylfuro[3,2-c]quinolin-8-ol and two equivalents of 2,2-dimethyl-6-phenoxyhexanoyl chloride, the product obtained is 2,2-dimethyl-6-phenoxyhexanoic acid, diester with 2,3,3a,4,5,9b-hexahydro-4-(p-hydroxyphenyl)-9b-methylfuro[3,2-c]quinolin-8-ol.

Certain starting materials required in the foregoing procedures can be prepared as follows. With stirring and external cooling to maintain the temperature below 10° C., 250 ml. of a 1.6 N solution of n-butyllithium in heptane is added to a solution of 41 g. of diisopropylamine and 250 ml. of anhydrous tetrahydrofuran under nitrogen. The resulting mixture contains lithium diisopropylamide. After 10 minutes a solution of 17.6 g. of isobutyric acid in 25 ml. of tetrahydrofuran is added and the reaction mixture is stirred an additional 10 minutes at 0° C. and an additional 30 minutes at room temperature. It is cooled again to 0° C. and treated with a solution of 43.0 g. of 3-phenoxypropyl bromide in 50 ml. of tetrahydrofuran while the temperature is maintained below 10° C. After 15 minutes the mixture is allowed to warm to room temperature and stirring is continued for 16 hours. The mixture is hydrolyzed with 500 ml. of water and the aqueous phase is separated, washed with 200 ml. of ether, and acidified with 70 ml. of 6 N sulfuric acid to give an insoluble product, 2,2-dimethyl-5-phenoxyvaleric acid. For purification, the product is dissolved in ether and the ether solution is washed with water, dried over magnesium sulfate, and evaporated. The product is crystallized from isooctane; M.P. 73–75° C. In the same manner, with the substitution of 45.8 g. of 4-phenoxybutyl bromide in 100 ml. of tetrahydrofuran for the 3-phenoxypropyl bromide in tetrahydrofuran, the product obtained is 2,2-dimethyl-6-phenoxyhexanoic acid; M.P. 106–107.5° C. following crystallization from acetonitrile. A solution of 15.6 g. of 2,2-dimethyl-5-phenoxyvaleric acid, 1 ml. of pyridine, and 75 ml. of methylene chloride is treated with 7 ml. of thionyl chloride. The mixture is heated at reflux for 2 hours and distilled to dryness under reduced pressure to leave a residue of 2,2-dimethyl-5-phenoxyvaleryl chloride. 2,2-dimethyl-6-phenoxyhexanoyl chloride is prepared similarly from 2,2-dimethyl-6-phenoxyhexanoic acid and thionyl chloride.

Example 11

A mixture of 2.00 g. of 2,3,3a,4,5,9b-hexahydro-4-(p-hydroxyphenyl)-9b-methylfuro[3,2-c]quinolin-8-ol, p-acetate ester, 0.88 g. of heptanoyl chloride, and 20 ml. of pyridine is stirred at room temperature for 20 hours and then poured into dilute sodium hydroxide solution. The mixture is extracted with chloroform and the chloroform extract is washed with dilute hydrochloric acid and with water, dried over anhydrous potassium carbonate, and evaporated to dryness to give a residue of heptanoic acid, 2,3,3a,4,5,9b-hexahydro-4-(p-hydroxyphenyl) - 9b - methylfuro[3,2-c]quinolin-8-yl ester, acetate ester; M.P. 94–96° C. following crystallization from isopropyl alcohol (50% isomer A and 50% isomer B).

Similarly, from 2,3,3a,4,5,9b-hexahydro-4-(p-hydroxyphenyl)-9b-methylfuro[3,2-c]quinolin - 8 - ol, 8-acetate ester and heptanoyl chloride, the product obtained is heptanoic acid, p-ester with 2,3,3a,4,5,9b-hexahydro-4-(p-hydroxyphenyl)-9b-methylfuro[3,2-c]quinolin-8-ol, 8-acetate ester; M.P. 110–111° C. (50% isomer A and 50% isomer B).

Similarly, from 2,3,3a,4,5,9b-hexahydro-4-(p-hydroxyphenyl)-9b-methylfuro[3,2-c]quinolin-8-ol and two equivalents of cyclohexanecarbonyl chloride, the product obtained is cyclohexane carboxylic acid, diester with 2,3,3a,4,5,9b-hexahydro-4-(p-hydroxyphenyl) - 9b - methylfuro[3,2-c]quinolin-8-ol; M.P. 128–135° C.

Similarly, from 2,3,3a,4,5,9b-hexahydro-4-(p-methoxyphenyl)-9b-methylfuro[3,2-c]quinolin-8-ol and β-cyclopentylpropionyl chloride, the product obtained is cyclopentanepropionic acid, ester with 2,3,3a,4,5,9b-hexahydro - 4 - (p-methoxyphenyl)-9b-methylfuro[3,2-c]quinolin-8-ol; M.P. 91–93° C.

Similarly, from 2,3,3a,4,5,9b-hexahydro-4-(p-hydroxyphenyl)-9b-methylfuro[3,2-c]quinolin-8-ol and two equivalents of benzoyl chloride, the product obtained is 2,3,3a,4,5,9b-hexahydro-4-(p-hydroxyphenyl) - 9b - methylfuro[3,2-c]quinolin-8-ol, dibenzoate ester; M.P. 161–162° C. (17% isomer A and 83% isomer B).

Similarly, from 2,3,3a,4,5,9b-hexahydro-4-(p-methoxyphenyl)-9b-methylfuro[3,2-c]quinolin-8-ol and 3,4,5-trimethoxybenzoyl chloride, the product obtained is 3,4,5-trimethoxybenzoic acid, ester with 2,3,3a,4,5,9b-hexahydro-4-(p-methoxyphenyl) - 9b - methylfuro[3,2-c]quinolin-8-ol; M.P. 179–182° C.

Similarly, from 2,3,3a,4,5,9b-hexahydro-4-(p-hydroxyphenyl-9b-methylfuro[3,2-c]quinolin-8-ol, p-acetate ester and cinnamoyl chloride, the product obtained is cinnamic acid, 2,3,3a,4,5,9b-hexahydro - 4 - (p-hydroxyphenyl)-9b-methylfuro[3,2-c]quinolin-8-yl ester, acetate ester; M.P. 165–167° C. (isomer B).

Similarly, from 2,3,3a,4,5,9b-hexahydro-4-(p-methoxyphenyl)-9b-methylfuro[3,2-c]quinolin-8-ol and 2-(2,4,6-trichlorophenoxy)propionyl chloride, the product obtained is 2-(2,4,6-trichlorophenoxy)propionic acid, 2,3,3a,4,5,9b-hexahydro - 4 - (p-methoxyphenyl)-9b-methylfuro[3,2-c]quinolin-8-yl ester; M.P. 96–103° C. following crystallization from isopropyl alcohol (isomer B).

Similarly, from 2,3,3a,4,5,9b-hexahydro-4-(p-methoxyphenyl)-9b-methylfuro[3,2-c]quinolin-8-ol and methoxyacetyl chloride, the product obtained is 2,3,3a,4,5,9b-hexahydro - 4 - (p-methoxyphenyl)-9b-methylfuro[3,2-c]quinolin-8-ol, methoxyacetate ester.

Similarly, from 2,3,3a,4,5,9b-hexahydro-4-(p-hydroxyphenyl)-9b-methylfuro[3,2-c]quinolin-8-ol and two equivalents of cyclopropanecarbonyl chloride, the product obtained is cyclopropanecarboxylic acid, diester with 2,3,3a,4,5,9b - hexahydro - 4 - (p-hydroxyphenyl)-9b-methylfuro[3,2-c]quinolin-8-ol; M.P. 128–130° C. following crystallization from isopropyl alcohol (isomer B).

Similarly, from 2,3,3a,4,5,9b-hexahydro-4-(p-hydroxyphenyl)-9b-methylfuro[3,2-c]quinolin-8-ol, 8-acetate ester and 3,4-dichlorobenzoyl chloride, the product obtained is 3,4-dichlorobenzoic acid, p-(2,3,3a,4,5,9b-hexahydro-8-hydroxy-9b-methylfuro[3,2 - c]quinolin-4-yl)phenyl ester, acetate ester; M.P. 184–186° C. following crystallization from acetonitrile (isomer B).

Similarly, from 2,3,3a,4,5,9b-hexahydro-4-(p-methoxyphenyl)-9b-methylfuro[3,2-c]quinolin-8-ol and O-acetylmandeloyl chloride, the product obtained is mandelic acid, acetate ester, 2,3,2a,4,5,9b-hexahydro - 4 - (p-methoxyphenyl) - 9b - methylfuro[3,2-c]quinolin-8-yl ester; M.P. 172–174° C. following crystallization from ether (15% isomer A and 85% isomer B).

Similarly, from 2,3,3a,4,5,9b-hexahydro-4-(p-methoxyphenyl)-9-methylfuro[3,2-c]quinolin-8-ol and the acid chloride of nicotinic acid, the product obtained is nicotinic acid, ester with 2,3,3a,4,5,9b-hexahydro-4-p-methoxyphenyl)-9b-methylfuro[3,2-c]quinolin-8-ol; M.P. 183–186° C. following crystallization from isopropyl alcohol (isomer B).

Similarly, from 2,3,3a,4,5,9b-hexahydro-4-(p-methoxyphenyl)-9b-methylfuro[3,2-c]quinolin-8-ol and the acid chloride of 2-chlorocinchoninic acid, the product obtained is 2-chlorocinchoninic acid, ester with 2,3,3a,4,5,9b-hexahydro-4-(p - methoxyphenyl)-9b-methylfuro[3,2-c]quinolin-8-ol; M.P. 176–203° C. following crystallization from acetonitrile (10% ismer A and 90% isomer B).

Similarly, from 2,3,3a,4,5,9b-hexahydro-4-(p-methoxyphenyl)-9b-methylfuro[3,2-c]quinolin-8-ol and the acid chloride of 2-furancarboxylic acid, the product obtained is 2-furoic acid, ester with 2,3,3a,4,5,9b-hexahydro-4-(p-methoxyphenyl) - 9b - methylfuro[3,2-c]quinolin-8-ol; M.P. 164–166° C. following crystallization from acetonitrile (isomer B). The product comprising 20% isomer A and 80% isomer B, obtained similarly, has M.P. 151–153° C.

Similarly, from 2,3,3a,4,5,9b-hexahydro-4-(p-methoxyphenyl)-9b-methylfuro[3,2-c]quinolin-8-ol and the acid chloride of 2-thiophenecarboxylic acid, the product obtained is 2-thiophenecarboxylic acid, ester with 2,3,3a,4,5,9b-hexahydro-4-(p-methoxyphenyl) - 9b - methylfuro[3,2-c]quinolin-8lol; M.P. 169–171° C. following crystallization from isopropyl alcohol (80% isomer A and 20% isomer B).

Similarly, esters are obtained by reacting 2,3,3a,4,5,9b-hexahydro-4-(p-methoxyphenyl) - 9b - methylfuro[3,2-c]quinolin-8-ol with the acid chloride of each of the following acids:

2-phenylbutyric acid
2-(4-biphenyl)butyric acid
4-phenyl-3-methyl-3-butenoic acid
2-(4-biphenyl)-4-hexenoic acid
N-[1-methyl2,3-bis(p-chlorophenyl)propyl]maleamic acid
2-methyl-2-[p-(1,2,3,4-tetrahydro-1-naphthyl)phenoxy] propionic acid
5-methylpyrazole-3-carboxylic acid
3-pyridineacetic acid The acid chlorides of the above acids can be obtained by reacting the corresponding acids with thionyl chloride.

Example 12

A solution of 6 g. of 2,3,3a,4,5-hexahydro-4-(p-hydroxyphenyl) - 9b-methylfuro[3,2-c]quinolin-8-ol (60% isomer A and 40% isomer B), 5.1 g. of phenoxyacetal chloride, and 20 ml. of pyridine is stirred for 2 hours and then extracted successively with ether and with chloroform. The ether extract and the chloroform extract are each washed with dilute sodium hydroxide, with 5% hydrochloric acid, and with water. The chloroform extract is dried and evaporated an dthe residue triturated with ether to give phenoxyacetic acid, diester with 2,3,3a,4,5,9b - hexahydro - 4 - (p-hydroxyphenyl)-9b-methylfuro[3,2-c]quinolin-8-ol; M.P. 130–138° C. Another fraction of the product precipitates from the ether extract upon standing; M.P. 140–152° C. These fractions differ in the proportions of isomer A and isomer B.

Example 13

A mixture of 2.5 g. of p-(2,3,3a,4,5,9b-hexahydro-8-methoxy - 9b - methylfuro[3,2-c]quinolin - 4 - yl)-phenol, acetate ester, 200 ml. of methanol, 25 ml. of water, and 5.0 g. of sodium hydroxide is heated at reflux for 2 hours. Most of the methanol is removed by distillation and the remaining mixture is neutralized and extracted with ether. The ether extract is washed with water, dried over anhydrous potassium carbonate, and evaporated to give a residue of p-(2,3,3a,4,5,9b-hexahydro-8-methoxy-9b-methylfuro[3,2-c]quinolin-4-yl)phenol. For purification, the product is crystallized from acetonitrile; M.P. 200–201° C.

Example 14

A solution of 5.0 g. of 2,3,3a,4,5,9b-hexahydro-4-(p-hydroxyphenyl) - 9b - methylfuro[3,2-c]quinolin - 8 - ol, 8-acetate ester (isomer B), 125 ml. of 1 N hydrochloric acid, and 125 ml. of methanol is heated at reflux for 2 hours, cooled, neutralized with sodium bicarbonate, and concentrated by distillation to a volume of 100 ml. The insoluble 2,3,3a,4,5,9b - hexahydro-4-(p-hydroxyphenyl)-9b-methylfuro[3,2-c]quinolin-8-ol (isomer B) which separates is collected on a filter. For purification, it is crystallized from acetonitrile; M.P. 252–256° C.

We claim:

1. A compound of the formula

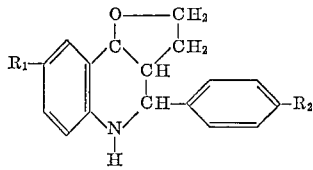

where one of $R_1$ and $R_2$ is a member of the class consisting of hydroxy and —OAc; and the other of $R_1$ and $R_2$ is a member of the class consisting of hydrogen, hydroxy, lower alkoxy, and —OAc; where Ac is an acyl group of a carboxylic acid of the class consisting of
   (a) lower alkanoic acids,
   (b) lower alkanoic acids additionally substituted by a member of the class consisting of methoxy, phenoxy, monohalophenoxy, dihalophenoxy, trihalophenoxy, and lower cycloalkyl,
   (c) lower cycloalkanecarboxylic acids,
   (d) benozic acid,
   (e) benzoic acid additionally substituted by a member of the class consisting of chlorine and methoxy,
   (f) cinnamic acid,
   (g) O-acetylmandelic acid,
   (h) nicotinic acid,
   (i) 2-chlorocinchoninic acid,
   (j) 2-furoic acid, and
   (k) 2-thiophenecarboxylic acid.

2. A compound according to claim 1 in which each of $R_1$ and $R_2$ is —OAc; where Ac is as defined in claim 1.

3. 2,3,3a,4,5,9b - hexahydro - 4-(p-hydroxyphenyl)-9b-methylfuro[3,2-c]quinolin-8-ol, diacetate ester.

4. A compound according to claim 1 in which one of $R_1$ and $R_2$ is hydroxy and the other of $R_1$ and $R_2$ is hydrogen.

5. 2,3,3a,4,5,9b - hexahydro - 4-(p-hydroxyphenyl)-9b-methylfuro[3,2-c]quinolin-8-ol.

References Cited

UNITED STATES PATENTS 2,650,226  8/1953  Andersag _____ 260—288

OTHER REFERENCES

Chem. Abst., 7th Coll. Index, vol. "Flu-Hw" 9764(S) (1965).

Povarov et al.: Absts. in Chem. Abstr. vol. 61, col. 16057 (1964).

Povarov et al.: Absts. in Chem. Abstr., vol. 62, col. 14625 (1965).

Pavarov et al.: Absts in Chem. Abstr., vol. 60, col. 9526–7 (1964).

DONALD G. DAUS, Primary Examiner

U.S. Cl. X.R.

260—283 SY, 286 R, 289 R, 295 R, 295.5, 310 R, 332.2 C, 346.1 R, 347.5, 479 R, 566 R, 691; 424—258